United States Patent
Ishizu et al.

(10) Patent No.: US 8,267,039 B2
(45) Date of Patent: Sep. 18, 2012

(54) COATING APPARATUS AND METHOD OF APPLYING COATING LIQUID

(75) Inventors: Seiji Ishizu, Toyota (JP); Hiroshi Oyama, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 285 days.

(21) Appl. No.: 12/746,796

(22) PCT Filed: Nov. 5, 2008

(86) PCT No.: PCT/JP2008/070545
§ 371 (c)(1),
(2), (4) Date: Jun. 8, 2010

(87) PCT Pub. No.: WO2009/075155
PCT Pub. Date: Jun. 18, 2009

(65) Prior Publication Data
US 2011/0097476 A1   Apr. 28, 2011

(30) Foreign Application Priority Data
Dec. 10, 2007   (JP) ................................ 2007-318255

(51) Int. Cl.
*B05C 11/02* (2006.01)
*B05C 11/10* (2006.01)
*C23C 16/52* (2006.01)

(52) U.S. Cl. ........ 118/663; 118/665; 118/668; 118/679; 118/680; 118/708; 427/8

(58) Field of Classification Search ......................... None
See application file for complete search history.

(56) References Cited

U.S. PATENT DOCUMENTS
5,558,716 A   9/1996   Mitani et al.
(Continued)

FOREIGN PATENT DOCUMENTS
EP   1 484 116 A2   12/2004
(Continued)

OTHER PUBLICATIONS

JP-2003-088791 Machine Translation Retrieved from JPO, Publication Date Mar. 2003.*

(Continued)

*Primary Examiner* — Michael Cleveland
*Assistant Examiner* — Francisco Tschen
(74) *Attorney, Agent, or Firm* — Finnegan, Henderson, Farabow, Garrett & Dunner, LLP

(57) ABSTRACT

To provide a coating apparatus and a coating method capable of accurately control the coating width of a coating liquid on an article to be coated. A coating apparatus 100 include conveying means having a plurality of rollers 21 and 22 for conveying a belt-shaped article to be coated, a coating die 11 for applying a coating liquid 32 to the article to be coated 31, the article to be coated 31 being conveyed by the conveying means, and positioning means for changing the position of the coating die 11 with respect to the article to be coated 31 in response to a coating width indicating the width of the coating liquid 32 applied to the article to be coated 31, wherein the coating die 11 vertically applies the coating liquid 32 from a position that is located at where the article to be coated 31 is wound by the roller 21 and below the central portion of the roller 21, and the positioning means controls the width of the coating liquid applied to the article to be coated 31 by moving the coating die 11 in horizontal directions.

8 Claims, 6 Drawing Sheets

U.S. PATENT DOCUMENTS

2001/0032587 A1* 10/2001 Falck et al. .................. 118/679
2007/0248745 A1 10/2007 Wakai et al.

FOREIGN PATENT DOCUMENTS

| JP | 2001-321710 | 11/2001 |
| JP | 2003-88791 | 3/2003 |
| JP | 2005-883 | 1/2005 |
| JP | 2005-238169 | 9/2005 |

OTHER PUBLICATIONS

International Search Report in PCT/JP2008/070545 (Mar. 4, 2009).

* cited by examiner

SAME MOVEMENT AMOUNTS

DIFFERENT MOVEMENT AMOUNTS

COATING APPARATUS AND METHOD OF APPLYING COATING LIQUID

CROSS-REFERENCE TO RELATED APPLICATIONS

This application is a national phase application of International Application No. PCT/JP2008/070545, filed Nov. 5, 2008, and claims the priority of Japanese Application No. 2007-318255, filed Dec. 10, 2007, the contents of both of which are incorporated herein by reference.

TECHNICAL FIELD

The present invention relates to a coating apparatus and a coating method for applying a coating liquid containing active material to metal foil or the like, or for doing a similar process.

BACKGROUND ART

In order to realize a new type of secondary battery for use in an electrically-powered car, it is necessary to develop battery material that is capable of achieving dramatically high-energy density and high capacity, enabling low cost, and assuring high safety, and to develop a manufacturing technique for such batteries.

An electrically-powered car (fuel-cell powered car) is a car that is driven by electric energy generated by a fuel cell. Although a fuel cell has sufficiently higher efficiency than that of a gasoline engine, it has a characteristic that the maximum effect is achieved particularly in a low-load region. Therefore, it is imperative that a high-performance secondary battery is used to supply electric power and supplement the driving energy for the driving during high-load power output such as acceleration in order to further improve the efficiency of the electric car system.

Furthermore, the utilization of a regenerating brake capable of recovering energy during deceleration, instead of relying on a mechanical brake, leads to higher efficiency in energy use. By recovering energy from regenerating braking, the secondary battery is temporality charged, and the charged electricity can be used for the driving energy as the need arises. The utilization of the secondary battery that can instantaneously supply electric power during driving, and instantaneously recover and store energy during braking depending on the driving states is indispensable for higher efficiency in energy use. Theoretically, the only battery that can satisfy these requirements for a car-mounted secondary battery is a lithium battery, and the practical usability of a (large-scale) car-mounted lithium battery is the key technology to establish a fuel-cell car system capable of making the maximum use of the high efficiency of the fuel cell.

Such lithium battery is, in general, produced by applying active material containing lithium and active material containing carbon to aluminum foil and copper foil respectively, drying them, and repeating these steps to form them on both sides (front surfaces and back surfaces) of the foils. In this process, a coating apparatus (coating machine) is used to apply the active material to the metal thin films.

Patent Citation 1: Japanese Unexamined Patent Application Publication No. 2001-321710.

DISCLOSURE OF INVENTION

Technical Problem

Incidentally, as shown in FIG. 3, a coating die 11 is disposed in the close proximity to an article to be coated 31 from a vertically downward position and a roller conveys the article to be coated 31 in the direction of the arrow such that a coating liquid is applied to the article to be coated 31 in a coating apparatus of the related art. At this point, if the coating die 11 is moved away from the article to be coated 31 in the vertically downward direction as shown in FIG. 4A, the coating width becomes narrower, and if the coating die 11 is moved toward the article to be coated 31 in the vertically upward direction as shown in FIG. 4B, the coating width becomes wider. The coating width of the coating liquid on the article to be coated 31 is controlled by using this feature. However, in the case where the coating width is, for example, to be changed by 0.2 mm, the variation in the vertical gap between the coating die 11 and the article to be coated 31 should be in the order of 1 µm. That is, since the control of the coating width requires such microscopic control, there has been a problem that an accurate control of the coating width has been very difficult, or that it has required fully-closed control and thereby increasing the cost.

The present invention has been made to solve such problem, and the object of the present invention is to provide a coating apparatus and a coating method capable of accurately control the coating width of a coating liquid on an article to be coated.

Technical Solution

In accordance with the present invention, a coating apparatus includes: conveying means having a plurality of rollers for conveying a belt-shaped article to be coated; a coating die for applying a coating liquid to the article to be coated, the article to be coated being conveyed by the conveying means; and positioning means for changing the position of the coating die with respect to the article to be coated in response to a coating width indicating the width of the coating liquid applied to the article to be coated; wherein the coating die vertically applies the coating liquid from a position that is located at where the article to be coated is wound by the roller and below the central portion of the roller; and the positioning means controls the width of the coating liquid applied to the article to be coated by moving the coating die in horizontal directions.

In the present invention, the coating die is moved in the conveying direction of the article to be coated by the positioning means. Since the variation in the coating width is insensitive to a movement in the conveying direction, the variation in the coating die can be increased, and thereby enabling easier and more accurate control of the coating width.

In addition, the positioning means can also control the thickness of the coating liquid applied to the article to be coated by rotating the coating die in the horizontal plane. The thickness of the coating can be easily controlled by just rotating the coating die in the horizontal plane.

Furthermore, the coating die may be placed in a region, that is located lower than the central portion of the roller and higher than the portion of the circumference of the roller that is located directly below the center of the roller, in a place where the article to be coated is wound by the roller.

Furthermore, the apparatus also includes detection means for detecting the coating width of the applied coating liquid, so that the positioning means can carry out the position control based on the detection result of the detection means. The provision of the detection means enables the automatic control of the coating width.

Furthermore, the apparatus also includes detection means for detecting a coating thickness indicating the thickness of the applied coating liquid, so that the positioning means can carry out the position control based on the detection result of the detection means. The provision of the detection means enables the automatic control of the coating thickness.

Furthermore, the coating liquid may be a liquid having viscosity that varies over time, and may be a liquid for which mixing to the same viscosity for each lot is very difficult. In the case where the viscosity varies over time, both the coating width and the coating thickness need to be controlled over time.

In accordance with the present invention, a method of applying a coating liquid for applying a coating liquid to a belt-shaped article to be coated includes applying the coating liquid to the article to be coated by a coating die, the article to be coated being wound and conveyed by a roller, and the coating die applying the coating liquid to the article to be coated from a position below the central portion of the roller, wherein a coating width indicating the width of the coating liquid on the article to be coated is controlled by moving the coating die in a direction roughly parallel to the direction in which the article to be coated is conveyed in response to the coating width.

Advantageous Effects

The present invention can provide a coating apparatus and a coating method capable of accurately control the coating width of a coating liquid on an article to be coated.

EXPLANATION OF REFERENCE

1 COATING APPARATUS
11 COATING DIE
12 COATING NOZZLE
21 ROLLER
24 STARTING ROLLER
25 ROLLER
31 ARTICLE TO BE COATED
41 MOTOR
42 COMPUTING UNIT
43 SENSOR
44 DRYING FURNACE

BEST MODE FOR CARRYING OUT THE INVENTION

An embodiment to which the present invention is applied is explained hereinafter with reference to the drawings. In this embodiment, the present invention is applied to a coating apparatus for applying active material containing lithium to metal foil (article to be coated) on which lithium and carbon, or similar substances are applied in advance.

Figure 1:
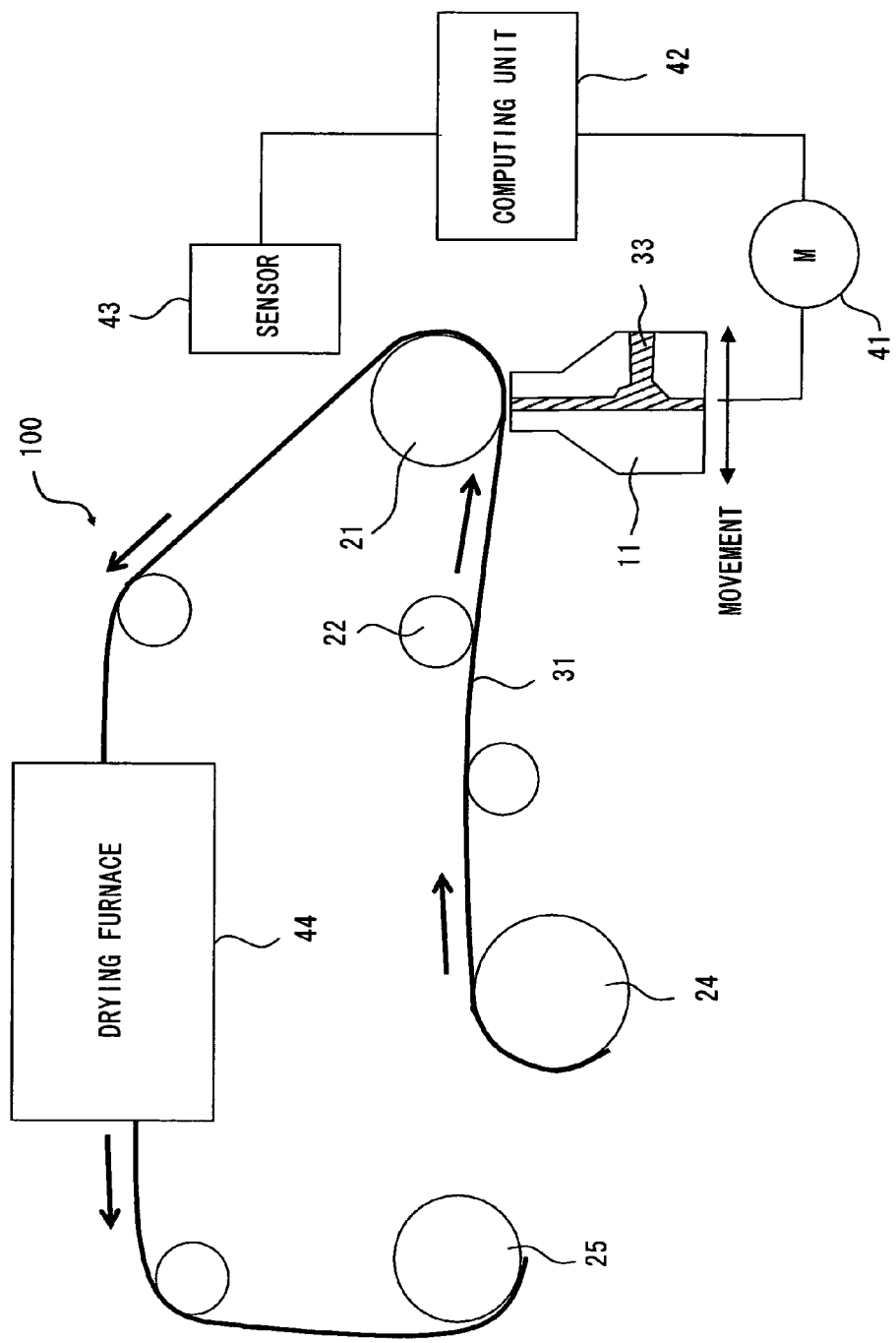
FIG. 1 shows a coating apparatus in accordance with one embodiment of the present invention.
Figure 2:
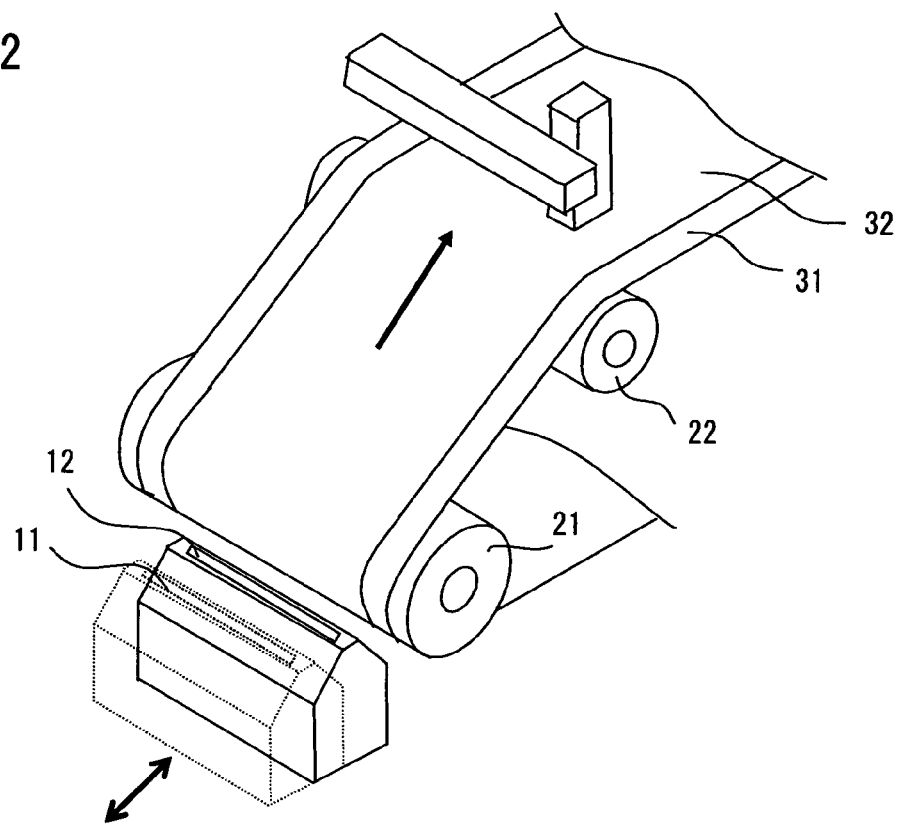
FIG. 2 is an enlarged view showing a portion of the coating apparatus in accordance with one embodiment of the present invention.

FIG. 1 shows a coating apparatus in accordance with this embodiment. Furthermore, FIG. 2 is an enlarged view of a part of the apparatus. A coating apparatus 1 has a starting roller 24 on which an article to be coated is wound, plural rollers 21 and 22 for conveying the article to be coated, and a roller 25 for winding the article to be coated on which a coating liquid 32 is applied. Furthermore, the apparatus also has a coating die 11 for applying the coating liquid 32, a motor 41 for controlling the position of the coating die 11, sensor(s) 43 for measuring the coating width and coating thickness of the coating liquid 32 applied to the article to be coated, and a computing unit 42 for generating a driving signal for the motor 41 by feedback control based on the sensor value(s) from the sensor(s) 43.

The article to be coated 31 is conveyed successively from the starting roller 24. The article to be coated 31 may be, for example, a metal thin film having a width of 600 mm and a thickness from 10 to 20 µm, on which lithium and carbon, or similar substances are applied in advance. As the article to be coated is conveyed to the roller 21 to which the coating die 11 is fixed, the coating liquid 32 is applied to the article to be coated by the coating die 11. The coating die 11 is oriented vertically upward and applies the coating liquid from a coating nozzle 12. Furthermore, the coating die 11 contains a reservoir 33 for the coating liquid. The article to be coated 31 on which the coating liquid is applied is conveyed to a drying furnace 44. It is dried there, and then wound on the winding roller 25. For example, the same process may be repeated several times for the article to be coated 31 on which the coating liquid is applied, so that the coating liquid is applied several times. The article to be coated 31 on which the coating liquid is applied may be used, for example, in lithium batteries.

The sensor 43 monitors the article to be coated 31 on which the coating liquid 32 is applied, and detects the coating width and the coating thickness on the article to be coated 31. The term "coating width" means the width in the direction perpendicular to the longitudinal direction of the article to be coated 31, of the area where the coating liquid is applied. The term "coating thickness" means the thickness of the coating liquid applied on the article to be coated 31. The computing unit 42 carries out feedback control by calculating a control value for the motor 41 based on the detection result of the sensor 43. The motor 41 moves the coating die 11 toward and away from the article to be coated 31 such that the coating width and the coating thickness are automatically controlled.

In this embodiment of the present invention, the coating liquid 32 is applied by the coating die 11 that applies the coating liquid 32 from a vertically downward position. Furthermore, the position of the coating die 11 is controlled by moving the coating die 11 in the horizontal direction in response to the coating width of the coating liquid 32 on the article to be coated 31. There seem to be two methods to control the coating width and the coating thickness by controlling the movement of the coating die 11, i.e., a method in which the coating die 11 is moved in a vertical direction, and a method in which the coating die 11 is moved in a horizontal direction. However, the method in which the coating die 11 is moved in a horizontal direction has smaller variations in the coating width and the coating thickness with respect to the amount of the movement of the coating die 11, as explained later. That is, the coating die 11 can be moved more widely to change the coating width and the coating thickness. Therefore, the position control of the coating die 11 for controlling the coating width becomes easier.

The viscosity of the coating liquid 32, which is used for lithium batteries, decreases over time. Therefore, if the gap between the article to be coated 31 and the coating die 11 is maintained constant, the coating width will fluctuate. Therefore, it is necessary to control the gap between the coating die 11 and the article to be coated 31 (which is explained later) over time. Since the gap is controlled by moving the coating die 11 in the horizontal direction in this embodiment, it can be moved relatively widely in the horizontal direction for the coating width control, and thereby making the control easier. In addition, the distance of the gap between the coating die 11 and the article to be coated 31 can be varied with location along the direction of the coating width by rotating the coating die 11 in the horizontal plane, as explained later. Therefore, a uniform coating thickness can be easily achieved even in the case where the original coating thickness is not uniform owing to a manufacturing error or the like.

Next, the coating width and the coating thickness of the coating liquid 32 are explained hereinafter.

Figure 3:
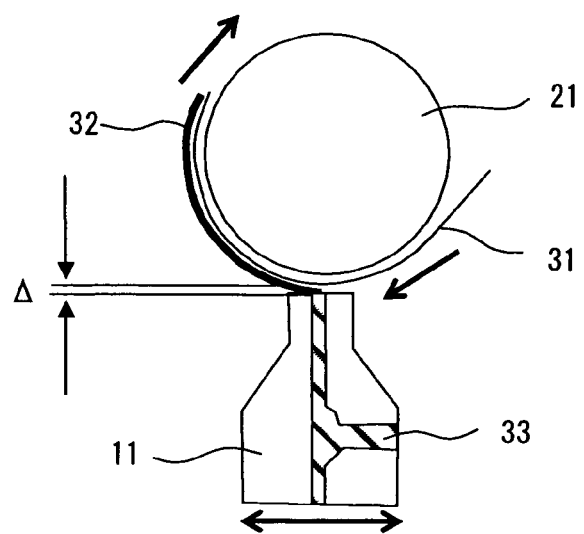
FIG. 3 shows an article to be coated and a coating die in the coating apparatus in accordance with one embodiment of the present invention.
Figure 4A:
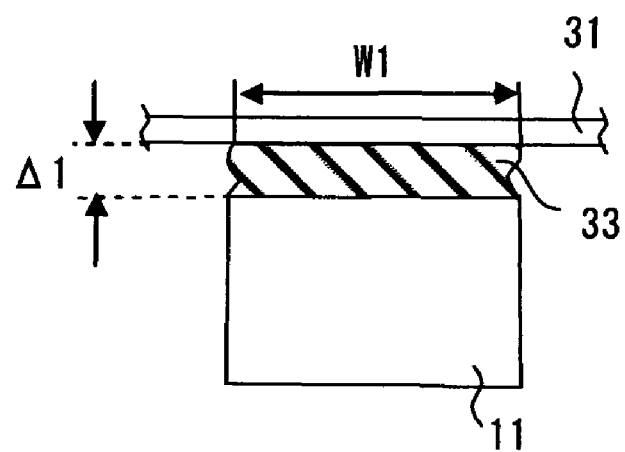
FIG. 4A show a relation between positions of an article to be coated and a coating die and the coating width.
Figure 4B:
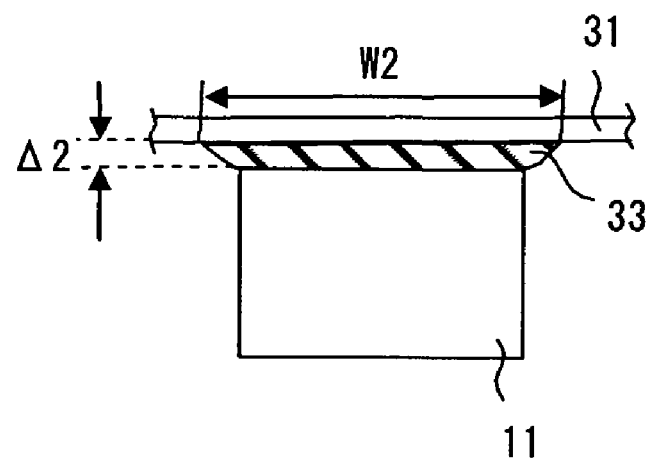
FIG. 4B show a relation between positions of an article to be coated and a coating die and the coating width.

FIG. 3 shows an article to be coated and a coating die, and FIG. 4 shows a relation between positions of an article to be coated and a coating die and the coating width. Incidentally, the same signs are assigned to the same components as those of the coating apparatus shown in FIGS. 1 and 2. As shown in FIG. 3, the coating width is determined by the gap Δ between the coating die 11 and the article to be coated 31 that is conveyed by the rotating roller 21. Specifically, as the gap Δ between the coating die 11 and the article to be coated 31 becomes larger (Δ1), the coating width W1 becomes narrower, as shown in FIG. 4A. On the other hand, as the gap Δ between the coating die 11 and the article to be coated 31 becomes smaller (Δ2<Δ1), the coating width W2 becomes wider (W2>W1), as shown in FIG. 4B.

Figure 5A:
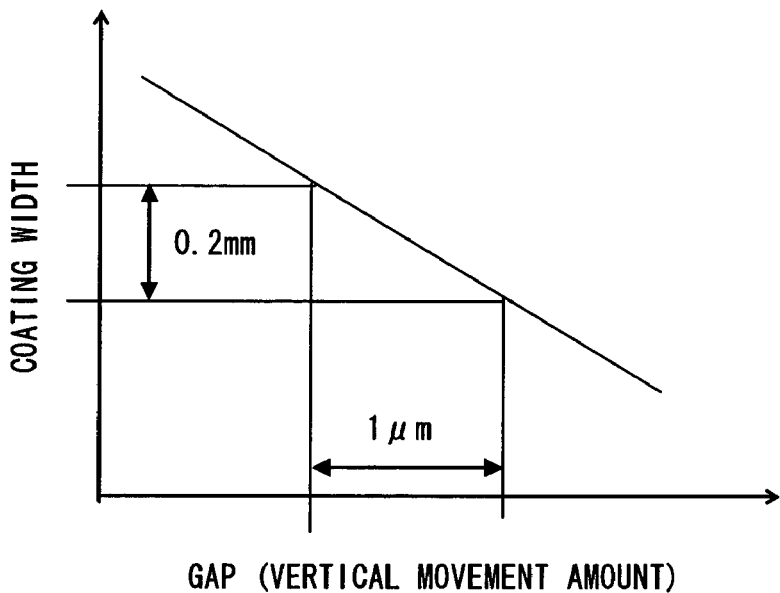
FIG. 5A show relations between the coating width and the gap.
Figure 5B:
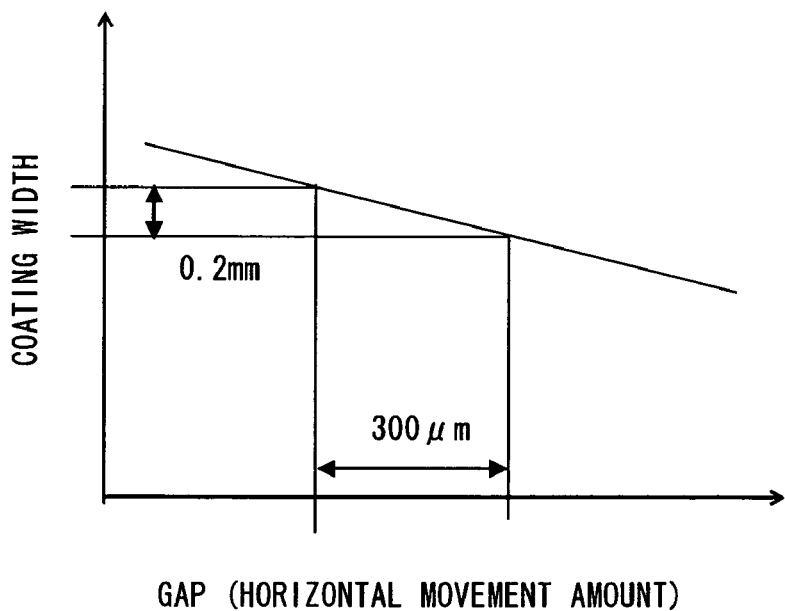
FIG. 5B show relations between the coating width and the gap.

FIGS. 5A and 5B shows relations between the coating width and the gap. As shown in FIG. 5A, the coating width and the vertical gap Δ between the article to be coated 31 and the coating die 11 have such relation that the gap Δ is changed by 1 μm in order to change the coating width by 0.2 mm. That is, a change in the coating width is so sensitive that the control is very difficult. To carry out the control in the order of μm, the apparatus needs to be equipped with a linear scale sensor and requires fully-closed control. Therefore, the adjustment of the equipment will be difficult, and the cost will increase.

Meanwhile, the horizontal gap Δ between the article to be coated 31 and the coating die 11 should be changed by 300 μm in order to change the coating width by 0.2 mm. In this manner, since the coating width is less sensitive to the horizontal movement than to the vertical movement, it does not require highly-accurate gap control and enables accurate control.

Figure 6A:
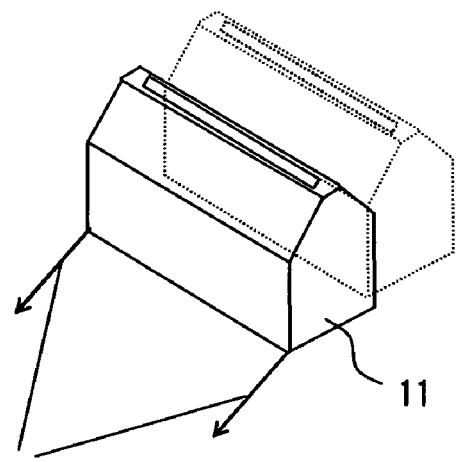
FIG. 6A show a position control method of a coating die.
Figure 6B:
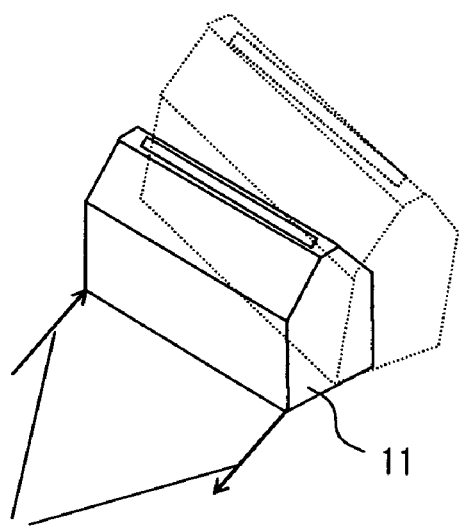
FIG. 6B show a position control method of a coating die.

Next, a control method in a case where the coating thickness is different between the left and right sides owing to the faulty alignment of the apparatus or the like. FIGS. 6A and 6B are diagrams illustrating a position control method of a coating die 11. As shown in FIG. 6A, the coating die 11 should be translated in the horizontal direction by applying the same forces to both sides of the coating die 11 under normal conditions.

Meanwhile, in the case where the coating thickness is different between the left and right sides, the distance of the gap Δ is varied between the left and right sides (in the horizontal direction). Therefore, the coating die 11 is rotated in the horizontal direction by applying different forces between the left and right sides, as shown in FIG. 6B. In this manner, the coating liquid 32 can be applied in a uniform thickness by altering the position of the coating die 11 even in the case where the coating liquid 32 applied to the article to be coated 31 has different thicknesses.

In this embodiment of the present invention, the coating width and the coating thickness are controlled by moving the coating die 11 of the coating apparatus 1 in the horizontal direction. By moving the coating die 11 in the horizontal direction, the variations in the coating width and the coating thickness caused by the positional change of the coating die 11 become insensitive to the movement, and therefore it can achieve an improvement in the robustness of the coating width accuracy, a reduction in the cost, and an improvement in the integrity. Furthermore, the coating profile can be controlled by rotating the coating die 11 in a horizontal plane such that the distance of the die gap Δ is varied between both sides of the coating width. In this manner, unevenness in the coating thickness or the like caused by faulty alignment of the coating die 11 or other peripheral components or the like can be easily compensated. In particular, two horizontally movable axes, each of which is individually movable, may be arranged on both sides of the coating die 11, so that the coating width is adjusted by moving the two axes by the same amounts, and unevenness in the coating thickness is compensated into an uniform coating width by differentiating the movement amounts between the two axes. Furthermore, a sensor 43 may be provided as an automatic detection means of the coating width, and the effect of disturbances such as viscosity fluctuations during the coating process can be compensated by feeding back the signal from the sensor and using it for the horizontal movement control, so that the coating width can be automatically controlled. Furthermore, a sensor 43 may be provided as an automatic detection means of the coating thickness, and the effect of faulty alignment of the coating apparatus 1 or the like can be compensated by carrying out feeding back control with the signal from the sensor 43 and controlling the rotation and the translation of the coating die 11, so that the coating thickness can be uniformly controlled in an automatic manner.

For example, as the means for detecting the coating width, an image may be captured and the coating width can be detected by processing the image. Furthermore, a laser displacement gauge may be used as the means for detecting the coating thickness. Furthermore, although an embodiment in which a coating liquid 32 for lithium batteries is applied is explained, the present invention is not limited to such embodiments and applicable to other embodiments, especially embodiments in which the viscosity of a coating liquid 32 varies over time.

Figure 7:
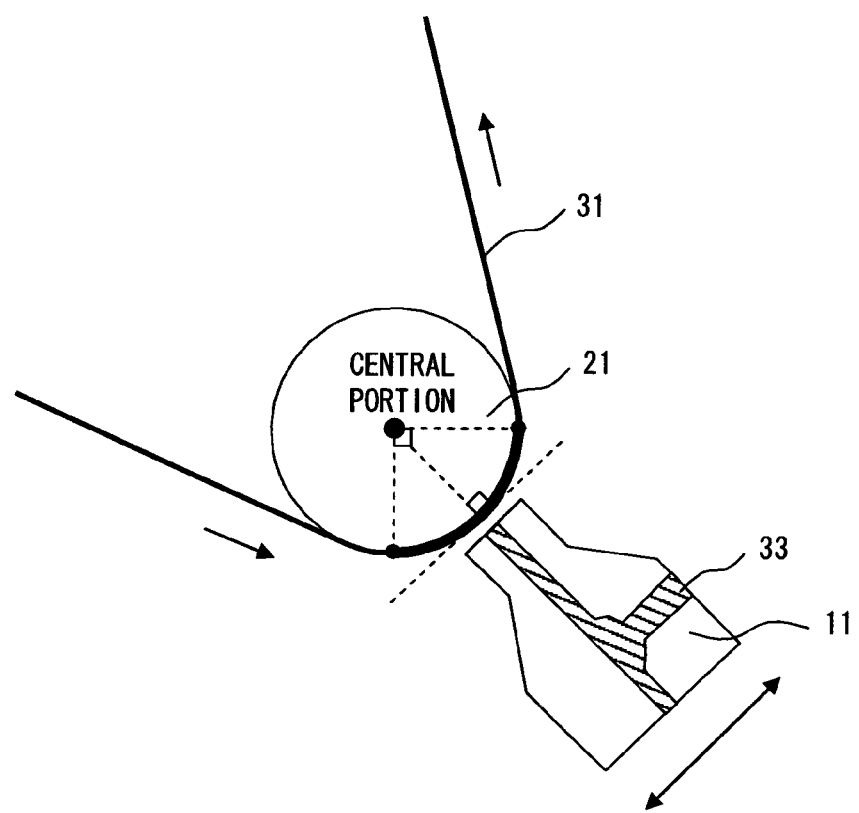
FIG. 7 shows a positional relation between an article to be coated and a coating die.

Furthermore, although the coating die 11 is placed in the portion of the circumference of the roller 21 that is located directly below the center of the roller 21, in a place where the article to be coated 31 is wound by the roller 21 in this embodiment, the present invention is not limited to such embodiments. That is, the coating die 11 may be placed in a region, that is located lower than the central portion of the roller 21 and higher than the portion of the circumference of the roller 21 that is located directly below the center of the roller 21, in a place where the article to be coated 31 is wound by the roller 21, and the coating liquid 32 may be applied from the vertically downward position (see FIG. 7). In the case of this configuration, even if excessive liquid is dropped during the coating process, the coating liquid 32 is not splashed on the coating die 11 or the conveying means such as the motor 41, and thereby minimizing the deterioration of the coating apparatus 1.

The invention claimed is:

1. A coating apparatus comprising:
   conveying means having a plurality of rollers for conveying a belt-shaped article to be coated;
   a coating die for applying a coating liquid to the article to be coated, the article to be coated being conveyed by the conveying means; and
   positioning means for changing the position of the coating die with respect to the article to be coated in response to a coating width indicating the width of the coating liquid applied to the article to be coated;
   wherein the coating die applies the coating liquid to the article to be coated from a position where the article to be coated is wound by the roller and below the central portion of the roller; and
   the positioning means controls the width of the coating liquid applied to the article to be coated by moving the coating die in a direction substantially parallel to a direction in which the article to be coated is conveyed.

2. The coating apparatus according to claim 1, wherein the positioning means controls the thickness of the coating liquid applied to the article to be coated by rotating the coating die in a horizontal plane.

3. The coating apparatus according to claim 1, wherein the coating die is placed in a region, that is located lower than the central portion of the roller and higher than the portion of the circumference of the roller that is located directly below the center of the roller, in a place where the article to be coated is wound by the roller.

4. The coating apparatus according to claim 1, further comprising detection means for detecting the coating width of the applied coating liquid,
   wherein the positioning means carries out the position control based on a detection result of the detection means.

5. The coating apparatus according to claim 1, further comprising detection means for detecting the coating thickness of the applied coating liquid,
   wherein the positioning means carries out the position control based on a detection result of the detection means.

6. The coating apparatus according to claim 1, wherein the coating liquid is a liquid having viscosity that varies over time.

7. A coating apparatus comprising:
   a conveying portion having a plurality of rollers for conveying a belt-shaped article to be coated;
   a coating die for applying a coating liquid to the article to be coated, the article to be coated being conveyed by the conveying portion; and
   a positioning portion having a sensor for detecting a coating width indicating the width of the coating liquid applied to the article to be coated, a motor for changing the position of the coating die with respect to the article to be coated, and a computing unit for controlling the motor in response to the coating width detected by the sensor;
   wherein the coating die applies the coating liquid to the article to be coated from a position where the article to be coated is wound by the roller and below the central portion of the roller; and
   the positioning portion controls the width of the coating liquid applied to the article to be coated by moving the coating die in a direction substantially parallel to a direction in which the article to be coated is conveyed.

8. A method of applying a coating liquid for applying a coating liquid to a belt-shaped article to be coated comprising:
   applying the coating liquid to the article to be coated by a coating die, the article to be coated being wound and conveyed by a roller, and the coating die applying the coating liquid to the article to be coated from a position below the central portion of the roller;
   wherein a coating width indicating the width of the coating liquid on the article to be coated is controlled by moving the coating die in a direction substantially parallel to a direction in which the article to be coated is conveyed in response to the coating width.

* * * * *